United States Patent [19]

Olschewski et al.

[11] Patent Number: 4,591,352
[45] Date of Patent: May 27, 1986

[54] TENSION ROLLER

[75] Inventors: Armin Olschewski, Schweinfurt; Manfred Brandenstein, Eussenheim; Lothar Walter, Schweinfurt; Horst M. Ernst, Eltingshausen, all of Fed. Rep. of Germany

[73] Assignee: SKF Kugellagerfabriken GmbH, Schweinfurt, Fed. Rep. of Germany

[21] Appl. No.: 265,033

[22] Filed: May 18, 1981

[30] Foreign Application Priority Data

May 16, 1980 [DE] Fed. Rep. of Germany ... 8013203[U]

[51] Int. Cl.⁴ ............................................. F16H 55/12
[52] U.S. Cl. ..................................... 474/95; 474/112; 74/449; 384/505
[58] Field of Search ............................ 474/95, 96, 112; 74/449, 211; 411/122; 308/189 R, 196, 190, 191, 236

[56] References Cited

U.S. PATENT DOCUMENTS

| 1,782,622 | 11/1930 | Kilian | 308/196 |
| 1,798,700 | 3/1931 | Reach | 308/190 |
| 1,964,061 | 6/1934 | Insley | 308/190 |
| 1,980,123 | 11/1934 | Weber | 308/190 |
| 1,990,805 | 2/1935 | Watson et al. | 474/199 |
| 2,051,488 | 8/1936 | Kottlowski | 474/112 |
| 2,909,074 | 10/1959 | Scheiterlein | 474/112 |
| 3,733,919 | 5/1973 | Rupp, II | 474/112 |
| 4,033,196 | 7/1977 | Maedo | 474/199 |

FOREIGN PATENT DOCUMENTS 2617368  2/1977  Fed. Rep. of Germany ...... 474/112

OTHER PUBLICATIONS

German Gebrauchsmuster publication dated Feb. 6, 1975, pp. 196, 197, in particular specification identified as 7328570 dated 8/4/73, on p. 196.

Primary Examiner—John E. Murtagh
Assistant Examiner—Andrew Joseph Rudy
Attorney, Agent, or Firm—Yuter, Rosen & Dainow

[57] ABSTRACT

A tension or idler roller for a belt drive system has an outer roller for engaging a belt, an inner support body adapted to be affixed to a machine, and a rolling bearing between the outer roller and the support body. The support body is comprised of a pair of identical cup-shaped elements oriented either with their open ends toward one another or their closed ends toward one another, the shells having an eccentric mounting. The inner ring of the bearing may be a separate element or it may be formed in the shells.

9 Claims, 2 Drawing Figures

TENSION ROLLER

BACKGROUND OF THE INVENTION

This invention relates to a tension or idler roller for a belt drive system, comprised of a hollow support body adapted to be eccentrically mounted, a rolling bearing mounted on the support body, and a roller rotatably mounted on the rolling bearing.

Tension rollers of this type are employed for various uses, for example, for use in textile machines and in internal combustion engines. In such arrangements the roller body, over whose outer surface a flat or toothed belt is adapted to run, is mounted on a support body having an eccentric mounting bore, by means of an intermediate rolling bearing. The support body is rotatably affixed to a suitable support or framework. By turning the eccentrically mounted support body, the tension roller is adjusted and thereby the tension of the belt is adjusted.

DESCRIPTION OF THE PRIOR ART

In one known arrangement, the support body for the tension roller directly forms the inner bearing part of a rolling bearing, and provides the eccentric mounting. In this arrangement the support body is loosely mounted to a machine part by means of a screw extending through the eccentric mounting arrangement, and the bolt is provided with an engaging surface so that it may be adjusted, for example, by means of a working surface, by rotation about the eccentrically mounted screw. In this arrangement the support body is a hollow body having a one or two sided guide element with eccentrically positioned bores which are connected to prevent turning with respect to the hollow body (DE-Gbm No. 7 328 570). In this known arrangment the support body is comprised of two different component parts so that it requires a greater production expense for the preparation of the parts and a more extensive inventory.

It is therefore the object of this invention to provide a tension roller that may be more easily produced, requires the use of less expensive tools, and in which the production cost and also the required inventory of the part is less expensive, so that the overall cost is minimized.

BRIEF DESCRIPTION OF THE INVENTION

Briefly stated, in accordance with the invention, the above object is achieved by providing a support body for the roller, comprised of two identically formed cup-shaped shells having one open side. The bottoms or closed sides of the shells are provided with guide surfaces for an element for holding the support body, and/or working surfaces for engaging an adjusting element. Both of these shells can be arranged, in accordance with a further feature of the invention either with their open sides toward one another and their bottoms directed away from one another, or so that the bottoms are directed toward one another.

As a result of the identical construction of the two shells forming the support body, the cost of production tools, the production expense, and also the inventory of the parts during the production are essentially reduced and simplified. The identically formed shells of the support body are produced in a simpler manner as drawn or spun elements, so that it is not necessary to employ great care in order to avoid later errors in the production of the roller.

In accordance with a further feature of the invention, the two shells can directly carry the inner race for the rolling bodies. In a two row bearing, an annular groove is worked in the outer surface of the two shells for the rolling bearing of the rolling bodies. In a single row bearing, in accordance with a further feature of the invention, each shell, on the open or closed end in the region of the outer surface is provided with a facing recess, such as for example, a chamfer, slope or groove, or the like, which forms a part of the inner race.

If space permits, it is also possible, in accordance with a further feature of the invention to provide the rolling bearing with a separate inner ring, instead of forming the inner race directly in the shells, In this arrangement, the two shells may be inserted in the bore of the inner ring of the bearing from opposite sides thereof. The shells may be arranged with their bottoms either directed toward one another or away from one another, and their facing surfaces may either contact one another or be spaced from one another.

In accordance with a still further feature of the invention, the roller on the outer surface of the outer ring is a unitary element having an essentially cup-shaped cross-section. The roller is preferably formed of sheet metal, and has an axially directed outer rim. As opposed to known two-part rollers, this arrangement has the advantage that it is only necessary to prepare a single element, and consequently, the requirement of interconnecting means is avoided.

DESCRIPTION OF THE DRAWINGS

In order that the invention will be more clearly understood, it will now be disclosed in greater detail with reference to the accompanying drawings, wherein.

DETAILED DESCRIPTION OF THE PREFERRED EMBDODIMENTS

Figure 1:
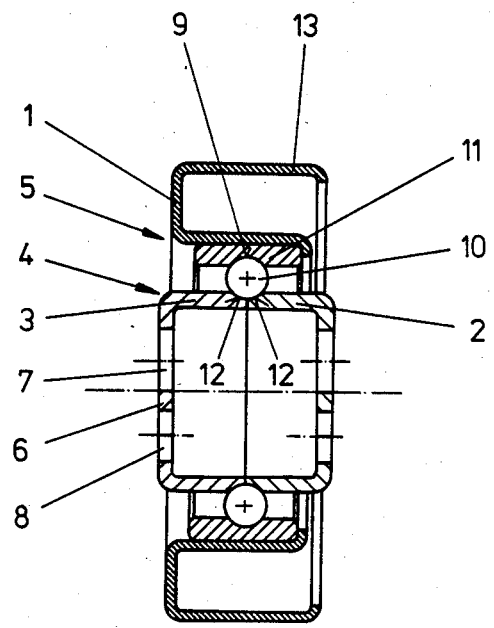
FIG. 1 is a section view of a tension or idler roller having a support element comprised of two shells, in accordance with the invention, wherein the shells directly support the inner race for the rolling body.

Referring now to the drawings, and more in particular to FIG. 1, therein is illustrated a tension or idler roller comprised of a roller 1, a central support element 4 comprised of two shells 2 and 3 fastened together, and a rolling bearing 5 arranged between the roller 1 and the support 4. The shells 2 and 3 are generally cup-shaped, and are arranged with their open sides directed toward one another, and hence their bottoms 6 directed away from one another. It will be obvious, of course, that the opposite orientation of these shells 2 and 3 may alternatively be employed. The bottom 6 of each of the shells 2 and 3 has an eccentric hole 7, which serves as a guide surface for a screw extending therethrough, to enable the attachable mounting of the tension roller to a machine element.

The bottom 6 of each of the shells has a working surface 8, such as a slot or the like extending therethrough, which serves as a gripping surface for an adjusting element (not shown) such as a screwdriver or the like. The roller 1 is rotatably supported on the rolling bearing 5, which is supported on the support element 4, and has an outer ring 11 defining the inner race 9 for the balls 10. The inner race 12 for the balls 10 is formed directly in the shells 2 and 3 defining the support 4. The inner race 12 is thereby formed on the open ends of each of the shells 2 and 3 in the region of the fastening means or the like arranged on the facing surfaces.

The connection of the shells forming the support 4 can be effected by means of the screw which extends to the holes 8 to hold the tension roller to a machine part, although other techniques may be employed for this purpose. For example, the shells may be held together by welding, brazing, or the like, or by the use of adhesives.

The roller body 1 is a unitary element, and is formed of sheet metal so that its cross-section is essentially cup-shaped, with an axially extending rim surrounding the element. A belt (not shown) runs on the outer surface of the rim 13, in the use of the tension roller. The roller thus has an inner cylindrical axially extending portion engaging the outer bearing ring, an intermediate radially extending portion depending from one end of the inner portion, and an outer cylindrical axially extending portion joined to the outer end of the intermediate portion. In order to assemble the structure in a simple manner, the roller body 1 may be pressed on the outer surface of the outer ring 11 of the rolling bearing 5.

Figure 2:
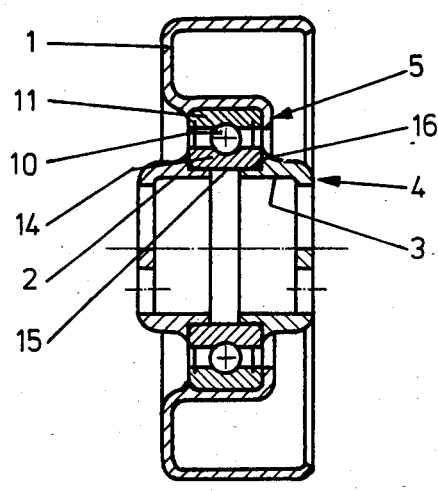
FIG. 2 is a cross-sectional view of a modification of a tension or idler roller in accordance with the invention in which the inner ring of a rolling bearing is set in the shells which form the center support.

In the example of the invention illustrated in FIG. 2, the rolling bearing 5 is not only provided with an outer ring 11 supporting the roller body 1, but also an inner ring 14 supported on the support element 4. The balls 10 roll between the outer ring 11 and the inner ring 14. In the assembly of this structure, the shells 2 and 3 are pressed in the bore 15 of the inner ring 12 from opposite sides thereof, the shells 2 and 3 having shoulders 16 on their surfaces which engage the inner ring 15 to axially position the inner ring and shells. In this arrangement the shells may be axially spaced apart, as shown, although alternatively they may contact one another.

As an alternative to the arrangement of the invention illustrated in FIGS. 1 and 2, the shells 2 and 3 may be so arranged that the bottoms 6 thereof are directed toward one another, either engaging one another or spaced apart. It will, of course, be apparent that further modifications may be made in the invention without departing from the spirit and scope of the following claims.

What is claimed is:

1. In a tension roller for a belt drive comprising a roller member, said roller member being supported on a hollow support body by means of an intermediate rolling bearing, the hollow support body having a pair of aligned eccentric mounting holes for receiving mounting means, the improvement wherein the hollow support body comprises a pair of substantially identical hollow pot-shaped members having oppositely directed open sides and bottoms, each of said bottoms having one of said eccentric mounting holes for eccentrically mounting the hollow members on said mounting means.

2. The tension roller of claim 1 wherein said eccentric mounting holes extend through said respective bottoms.

3. The tension roller of claim 1 further comprising working surfaces formed in said bottoms for receiving adjusting means.

4. The tension roller of claim 1 wherein the hollow members are arranged with their open sides directed toward one another and their bottoms directed away from one another.

5. The tension roller of claim 1 wherein the hollow members are arranged with their bottoms toward one another and their open sides away from one another.

6. The tension roller of claim 1 wherein the radially outer surface of said hollow members comprise an inner race for the rolling bodies of said rolling bearing.

7. The tension roller of claim 6 wherein said inner race comprises recess means on said hollow members.

8. The tension roller of claim 7 wherein the open ends of said hollow members are directed toward one another and said recesses are provided in the radially outer surface thereof in the region of said open ends.

9. The tension roller of claim 1 wherein said rolling bearing comprises an outer ring, an inner ring and rolling elements positioned between said inner and outer rings, said hollow members being inserted in the bore of said inner ring from opposite sides thereof.

* * * * *